United States Patent [19]

Schwarz

[11] Patent Number: 5,180,002
[45] Date of Patent: Jan. 19, 1993

[54] CYLINDER FOR RUBBER MIXING MILL

[75] Inventor: Martial Schwarz, Cournon-d'Auvergne, France

[73] Assignee: Michelin & Cie, Clermont-Ferrand Cedex, France

[21] Appl. No.: 855,848

[22] Filed: Mar. 23, 1992

[30] Foreign Application Priority Data

Mar. 22, 1991 [FR] France ............... 91/03607

[51] Int. Cl.$^5$ .......................... F28F 5/02
[52] U.S. Cl. ......................... 165/89; 72/201; 34/119
[58] Field of Search ............ 72/200, 201; 34/119; 165/89, 90

[56] References Cited

U.S. PATENT DOCUMENTS

| 1,382,608 | 6/1921 | Shuman | 165/89 X |
| 2,712,924 | 7/1955 | Nicolai | 165/89 |
| 3,120,867 | 2/1964 | Nash | 165/89 |
| 3,834,205 | 9/1974 | Maag et al. | 72/201 |
| 3,872,919 | 3/1975 | Maag | 165/30 |
| 4,050,510 | 9/1977 | Theysohn | 165/89 |
| 4,506,727 | 3/1985 | Swasey | 165/89 |

FOREIGN PATENT DOCUMENTS

| 2452734 | 5/1975 | Fed. Rep. of Germany | 165/89 |
| 9000980 | 6/1980 | Fed. Rep. of Germany | |
| 3528588 | 2/1987 | Fed. Rep. of Germany | |
| 1474319 | 2/1967 | France | |
| 2121919 | 1/1984 | United Kingdom | |

Primary Examiner—Allen J. Flanigan
Attorney, Agent, or Firm—Oblon, Spivak, McClelland, Maier & Neustadt

[57] ABSTRACT

Cylinder for rubber mixing mill, consisting of a hollow cylinder 1 and two flange-journals 2, 3 and driven by a hydraulic motor 21 with a hollow shaft. The hollow cylinder has longitudinal channels 4 provided with solid rods 8 fastened in the two flanges. The temperature regulation of the cylinder is provided by a crossed dual circuit. The temperature regulating fluid circulates in longitudinal channels 4 then cools the inner wall 19 of the hollow cylinder before being evacuated along the axis of the cylinder.

10 Claims, 4 Drawing Sheets

CYLINDER FOR RUBBER MIXING MILL

BACKGROUND OF THE INVENTION

1. Field of the Invention

The invention relates to machines that are used in the making of rubber mixtures.

2. Description of the Related Art

Most of the raw materials used in the rubber industry are solids which exhibit very irregular physical properties (balls of latex, isoprene plates, pellets of additives, powdered carbon black) and their unit masses, for example, vary from about a hundred kilograms to a few micrograms. Before being able to shape these products with accuracy, it is necessary to mix them thoroughly and make them plastic. These operations are successively performed in mixing mills of two types: (1) internal mixers which are closed and where two rotors having complementary shapes mix the rubbers and their fillers (such as carbon black); and (2) roller mixing mills consisting of rotating cylinders with parallel axes, between which the mixtures of products are made to pass several times in succession to homogenize them and change their physical properties (rheology, elasticity, etc.).

When the mixtures get to roller mixing mills, they must be rapidly cooled. Further, the material temperature must be regulated during the homogenization process.

The cylinders of current roller mixing mills are bulky parts which, with or without a central channel, can weigh 7 tons. Their length including journals exceeds 2 meters, and their diameter is on the order of 700 mm. The cylinders have numerous longitudinal channels (parallel to the cylinder axis) drilled from end to end and connected at their ends (see for example patent DE 23 15 669) to make possible a circulation of the temperature regulating liquid from one of the journals.

SUMMARY OF THE INVENTION

This invention has as an object to provide a rubber mixing mill cylinder that makes it possible to considerably improve the heat exchanges between said mixing mill cylinder and the mixtures, and also improve its mechanical strength.

For such a cylinder, this invention proposes a temperature regulating circuit which comprises longitudinal channels distributed regularly near the outside surface of the cylinder, in which the heat exchanging liquid circulates. At least some of the longitudinal channels are provided with solid rods to convert their sections for flow of the liquid into annular sections.

Another aspect of the invention relates to a rubber mixing mill cylinder consisting of at least three parts, a hollow cylinder and two flange-journals, wherein the hollow cylinder and the flange-journals are assembled by the rods fastened at each end in a flange-journal, in which the rods pass through the flange-journals and hollow cylinder in at least some of the longitudinal channels that are also used for the circulation of the heat exchanging liquid for thermal regulation.

The fastening of the rods is performed preferably by two nuts screwed onto each rod end after having heated the rod to a temperature higher than the maximum expected temperature reached during the operation of the mixing mill.

The role of the hot-mounted rods in the longitudinal channels is thus twofold: on the one hand, they convert a circular channel section into an annular section—which is very favorable for heat exchange since it increases the circulation speed at the same flow rate and promotes the change of type of flow—, and on the other hand, due to their thermal contraction, they act as braces between the two flanges and over the entire periphery of the hollow cylinder, which causes an axial compressive prestressing of the hollow cylinder and considerably increases its stability.

Another advantage of the invention is that it makes it possible to make only the two flange-journals of forged steel having excellent mechanical strength, while using molded cast iron for the actual cylinder which is stressed principally in radial compression.

The invention also permits considerable savings in weight. The cylinder has a weight on the order of 12 tons whereas a solid cylinder of equivalent geometry would have a weight greater than 17 tons; this savings in weight obviously brings about a savings of materials and a reduction of temperature lag.

The circulation of the temperature regulating liquid in the channels is performed by distributing the flows. But the fact of having a hollow cylinder with separate flange journals makes it possible to design much more hydrodynamic connections than when it is necessary to drill a single bulky part, and to be able to do it much more easily.

Preferably, the temperature regulating circuit of the cylinder according to the invention is dual, i.e., with halves of the dual circuit being placed at opposite ends relative to the axis of the cylinder, which makes possible opposite flows in adjacent longitudinal channels.

Another advantageous feature of the temperature regulating circuit of the cylinder according to the invention is that the heat exchanging fluid for thermal regulation, after having regulated the external surface of the hollow cylinder by passing through the annular longitudinal channels, circulates along the inside wall of said hollow cylinder and thus provides thermal homogenization before being evacuated via the axis of the cylinder.

According to yet another feature, the two parts of the temperature regulating circuit have a common central collector part followed by dual outlets that pass through both ends of said cylinder and in the axis of the cylinder.

To drive the cylinder according to the invention, a hydraulic motor is used. This hydraulic motor has a hollow output shaft making it possible for one of the two inlet-outlets of the temperature regulating circuit to pass through it.

The field of application of the invention relates mainly to mixing mills for rubbers but can also be applied to any other product, particularly mixers for paper pulp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The cylinder according to the invention consists of a hollow cylinder part 1 and two flange-journals 2 and 3.

Figure 1:
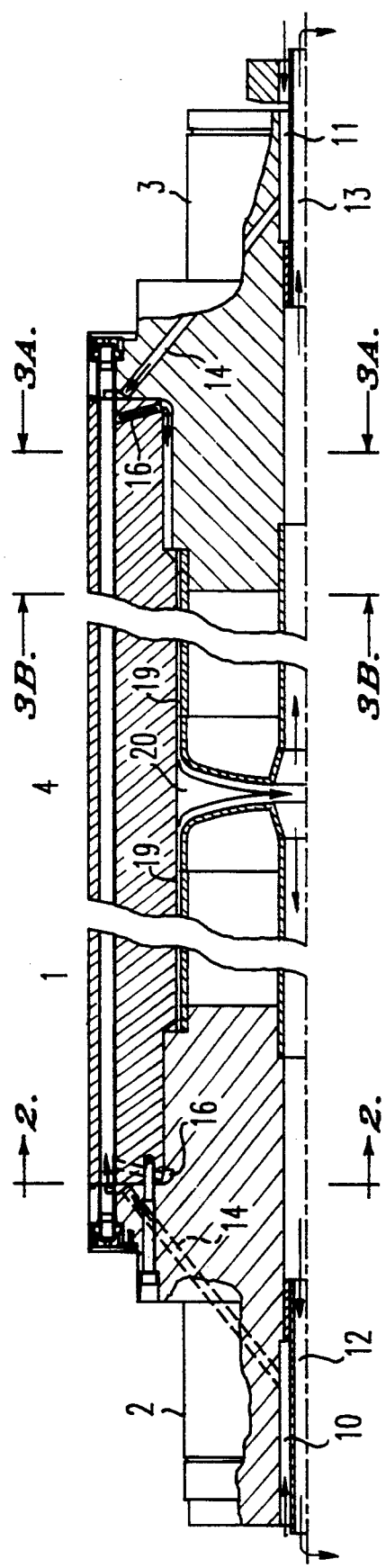
FIG. 1 is a longitudinal half-section passing through the axis of the cylinder.
Figure 2:
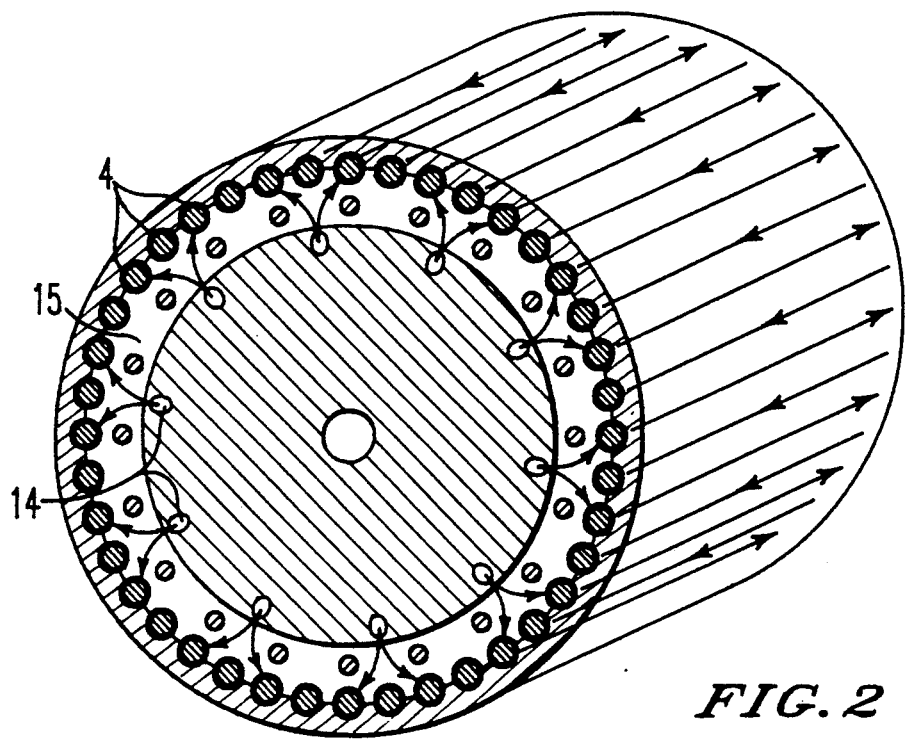
FIG. 2 is a cross section along plane A—A of FIG. 1.
Figure 4:
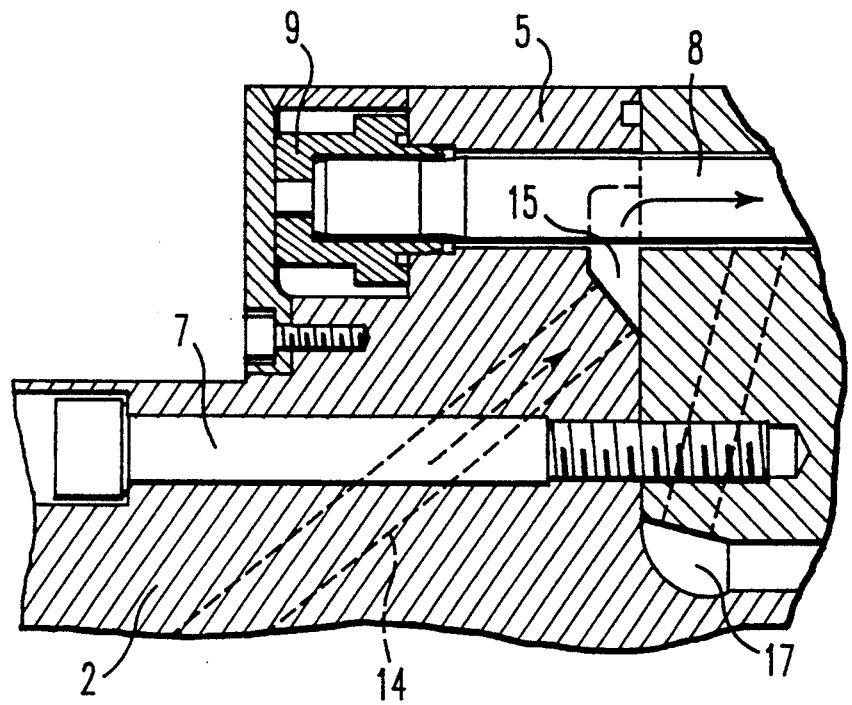
FIGS. 4 and 5 are longitudinal sectional views of detail parts 1 and 2 of FIG. 1, enlarged to better show certain details.
Figure 5:
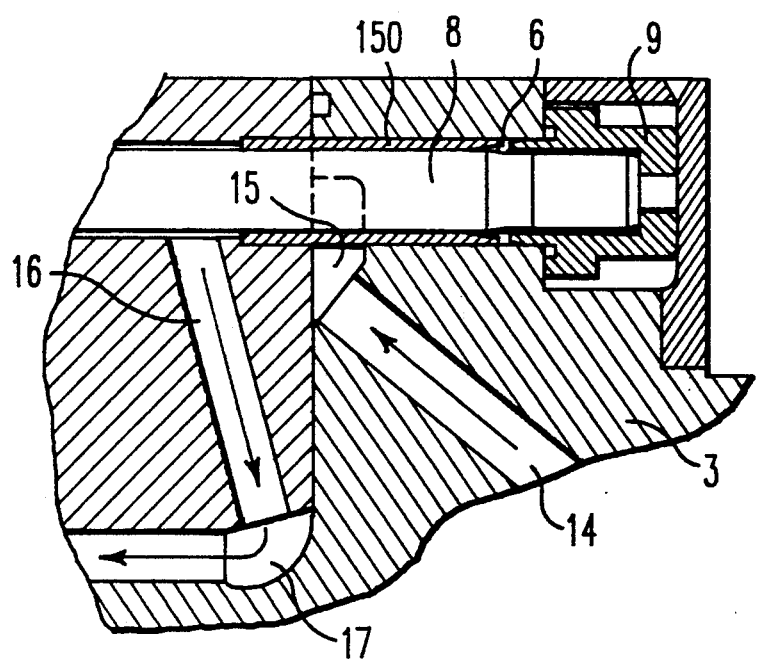

The hollow cylinder part is drilled with 40 longitudinal channels 4 (FIGS. 1 and 2) which extend into each flange-journal at 5 and 6 (FIGS. 4 and 5). Bolts 7 are used to hold the flange journals and cylinder part in place for the machining and assembly of the device. Each channel is provided with a solid rod 8, both ends of which are fastened to one of flange-journals 2 and 3.

The fastening of the rods 8 is performed by two nuts 9 screwed onto opposite ends of the rod after having heated the rods to a temperature higher than the expected maximum temperature of use (FIGS. 4 and 5).

Figure 3A:
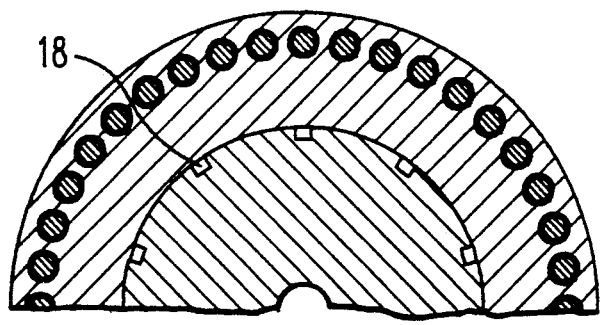
FIG. 3 shows two half cross sections along planes B—B and C—C of FIG. 1.
Figure 3B:
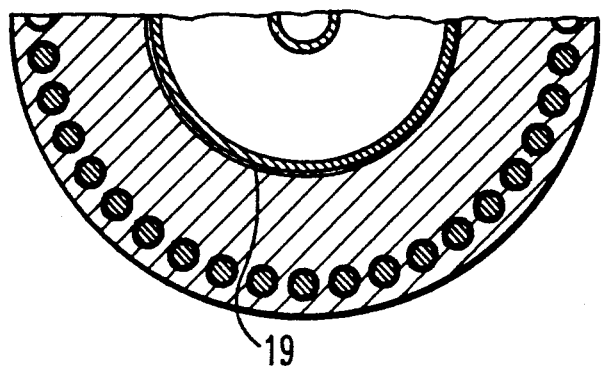

The temperature regulating circuit includes two (first and second) axial inlets 10 and 11 that are coaxial with two (first and second) axial evacuation ducts 12 and 13. Each axial inlet is part of a temperature regulating circuit constituted as follows. At an end of each of the two axial inlets, the distribution of the fluid is provided by a distribution circuit including 10 passages 14 which extend into a circular groove 15 (FIGS. 4 and 5) which feeds 20 longitudinal channels 4 (FIG. 2), i.e., alternating ones of the 40 channels 4 such that temperature regulating liquid flows in opposite direction in adjacent channels 4, thereby forming an inlet circuit. At the outlet of each of the channels 4, evacuation is provided by outlet circuits including evacuating passages 16 which connect to the channels 4 and come out in a circular groove 17. Sealing bushings 150 force the heat exchanging liquid, after having passed through annular channels 4, to enter the evacuation passages 16 before reaching circular groove 15. Groove 17 is itself connected to an internal flow passage circuit which is composed of 10 longitudinal grooves 18 and an annular passage 19 (FIG. 3). This annular passage 19 thermally regulates the inner wall of the hollow cylinder. Finally, the two annular passages 19 extend to a common collector part 20 at the center of the hollow cylinder, from which the heat exchanging liquid is evacuated through the axial ducts 12 and 13.

The design of this dual temperature regulating circuit, coupled with the sharp reduction of temperature lag of the cylinder, makes it possible to notably improve the thermal characteristics of heating and temperature regulation.

By way of example, in the case of a 20° C. heat exchanging fluid being water and having a 30 m³/hour fluid flow rate, 1.5 min instead of the conventional 15 min were enough to cool a cylinder from 40° to 24° C. Conversely, 50 sec instead of the conventional 240 was sufficient to heat a cylinder from 30° to 50° C. where the heat exchanging fluid was at 60° C. Moreover, while the heat exchanging fluid had flow rates on the order of 30 m³/hour, higher flow rates are also possible.

The crossed flow (i.e., in alternating channels 4) of the temperature regulating fluid provides a high thermal homogeneity of the hollow cylinder.

Finally, the design of this cylinder in three parts connected by elastic rods 8 allows temperature changes greater than 20° C. per minute, whereas fear of thermal fatigue previously prohibited changes greater than 1° C. per minute.

Figure 6:
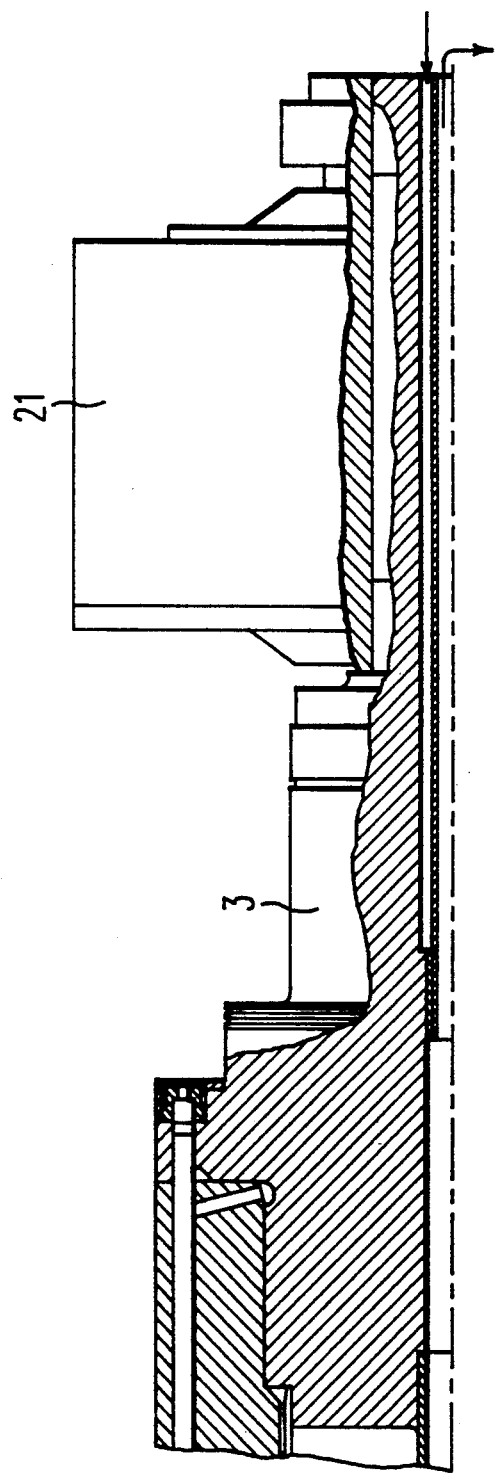
FIG. 6 is a longitudinal half-section of the drive motor with a flange-journal.

FIG. 6 shows a half section of a flange-journal 3 with hydraulic motor 21 with a hollow output shaft for driving the cylinder. The design of this hollow shaft motor makes it possible for the temperature regulating circuit to pass through the motor shaft.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A cylinder for a mixing mill, comprising:
   a cylinder part having a plurality of longitudinal channels extending therethrough in substantially the axial direction of the cylinder part, said channels being substantially evenly distributed adjacent the external periphery of the cylinder part;
   solid rods extending through at least some of said channels to form annular passages therebetween;
   means for flowing heat exchanging liquid through said channels so as to form a cylinder temperature regulating circuit, and
   flange journals mounted to opposite axial ends of said cylinder part, said rods having ends passing through said flange journals, further including means for securing said rods to said flange journals such that said flange journals are secured to said cylinder part via said rods.

2. The cylinder of claim 1 wherein said securing means comprise nuts threaded onto the ends of said rods while the rods are heated to a temperature greater than a maximum expected mixing mill temperature.

3. The cylinder of claim 1 wherein said temperature regulating circuit further comprises means for causing the heat exchanging liquid in adjacent ones of said channels to flow in opposite directions.

4. The cylinder of claim 1, wherein said temperature regulating circuit further comprises:
   first and second heat exchanging liquid inlet circuits respectively formed in said oppositely mounted flange journals and respectively connected to alternate ones of said channels, whereby the heat exchanging liquid flows in opposite directions in the alternate ones of said channels; and
   first and second outlet circuits respectively formed in said flange journals and connected to said channels.

5. The cylinder of claim 4 wherein said outlet circuits include internal flow passages along the internal periphery of said cylinder and connected to said channels.

6. The cylinder of claim 5 wherein said first and second inlet circuits each comprise:
   an axial inlet extending along the rotational center of one of said flange journals; and
   a distribution circuit connecting said axial inlet with alternating ones of said channels.

7. The cylinder of claim 6 wherein said first and second outlet circuits each further comprise:
   an axial outlet coaxial with said axial inlet; and
   a collector part connected between said internal flow passages and said axial outlet.

8. The cylinder of claim 7 wherein a single collector part is common to both of said outlet circuits.

9. The cylinder of claim 1 including a drive motor having a hollow drive shaft through which one of said flange journals pass.

10. The cylinder of claim 2 wherein said cylinder part is formed of cast iron and said flange journals are formed of forged steel.

* * * * *